(12) United States Patent
Cama et al.

(10) Patent No.: US 9,747,348 B2
(45) Date of Patent: Aug. 29, 2017

(54) PERSONALITY-RELEVANT SEARCH SERVICES

(71) Applicant: International Business Machines Corporation, Armonk, NY (US)

(72) Inventors: Karl J. Cama, Southlake, TX (US); Andrew R. Freed, Cary, NC (US); Norbert Herman, Denver, CO (US); Shubhadip Ray, Secaucus, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/939,035

(22) Filed: Nov. 12, 2015

(65) Prior Publication Data

US 2017/0139916 A1  May 18, 2017

(51) Int. Cl.
*G06F 17/30* (2006.01)

(52) U.S. Cl.
CPC .... *G06F 17/3053* (2013.01); *G06F 17/30554* (2013.01); *G06F 17/30864* (2013.01)

(58) Field of Classification Search
CPC ...................................................... G06F 17/30
See application file for complete search history.

(56) References Cited

U.S. PATENT DOCUMENTS

| 6,539,377 | B1 | 3/2003 | Culliss | |
| 7,827,170 | B1 * | 11/2010 | Horling | G06F 17/3053 |
| | | | | 707/722 |
| 7,890,581 | B2 | 2/2011 | Rao et al. | |
| 8,135,729 | B2 * | 3/2012 | Brewer | G06F 17/3097 |
| | | | | 707/767 |
| 8,442,973 | B2 | 5/2013 | Cramer et al. | |
| 8,498,974 | B1 * | 7/2013 | Kim | G06F 17/30867 |
| | | | | 707/706 |
| 8,612,435 | B2 * | 12/2013 | Sambrani | G06F 17/30702 |
| | | | | 707/734 |
| 2005/0222989 | A1 * | 10/2005 | Haveliwala | G06Q 30/02 |
| | | | | 707/999.003 |
| 2006/0074883 | A1 * | 4/2006 | Teevan | G06F 17/30867 |
| | | | | 707/999.003 |
| 2007/0106663 | A1 | 5/2007 | Rosenberg | |
| 2009/0157490 | A1 * | 6/2009 | Lawyer | G06Q 10/063 |
| | | | | 705/59 |

(Continued)

OTHER PUBLICATIONS

IBM; Personality Insights, IBM Watson Developer Cloud, 2015.

*Primary Examiner* — Khanh Pham
(74) *Attorney, Agent, or Firm* — Garg Law Firm, PLLC; Rakesh Garg; Christopher K. McLan

(57) ABSTRACT

For a search query submitted by a user, a result set including a plurality of pages is obtained. A first and a second personality score of a first and a second page, respectively, is determined using a value of a personality trait of the user and a weight associated with the value, and at least one of (i) a personality score of a site from which a first page is obtained based on a personality analysis of another content on the site, and (ii) a personality score of an author of the first page based on a personality analysis of another content published by the author. The first page is ordered ahead of the second page when the first personality score exceeding the second personality score, even when the first page and the second page are equally relevant to the search query.

19 Claims, 7 Drawing Sheets

(56) References Cited

U.S. PATENT DOCUMENTS

| | | |
|---|---|---|
| 2009/0248682 A1 | 10/2009 | Hueter et al. |
| 2013/0297581 A1 | 11/2013 | Ghosh et al. |
| 2014/0019443 A1* | 1/2014 | Golshan ............ G06F 17/30867 707/723 |
| 2015/0310344 A1* | 10/2015 | Gunjan ................ G06N 99/005 706/52 |

* cited by examiner

PERSONALITY-RELEVANT SEARCH SERVICES

TECHNICAL FIELD

The present invention relates generally to a method, system, and computer program product for search services on structured and unstructured data and content. More particularly, the present invention relates to a method, system, and computer program product for personality-relevant search services.

BACKGROUND

Online search is a method of using a search engine, which executes on a computer, to search for information that is available in electronic form. Many search engines are presently available for performing online searches.

For example, some search engines, which execute on a server data processing system that is accessible over a data network, can be accessed by client-side component executing on a client data processing system, e.g., a user's computer system. A search application on a client data processing system, which can be accessed via an Application Program Interface (API), a command-line prompt, or some other integration mechanism can also be used on a client data processing system to access the server-side implementation of a search engine. For example, a search application can be a stand-alone interface for accessing the search engine.

As another example, the search application can be integrated into another application to enable the other application to access the search engine. A search bar embedded in a browser application on a client data processing system is one example of such an integrated client-side component.

Hereinafter, "search engine" refers to the server-side implementation of the application that accesses the searchable data and performs a requested search query. Hereinafter, "search application" refers to a client-side application or component, using which a user can send a search term or query to the search engine. A user of a search application can be a human, a hardware system, or a software application.

Typically, a user provides the search application a word, phrase, text snippet, or a string of alphanumeric or symbolic characters, as a search term. The search application communicates the search term to the search engine. The search engine forms a search query using the search term. The search engine accesses data, which comprises a repository of information or an index thereof stored electronically.

The search engine performs the search query on the data and obtains a result set. The result set includes data that corresponds to the search query. The search engine returns the result set to the search application. The search application provides or presents the result set to the user.

A page is an organization of searchable online content. A website or mobile site—includes one or more pages that can be crawled, indexed and searched. An index of the page is searchable data or content corresponding to the page as maintained by a search engine. When a search engine processes a search query, the search engine uses the index of the pages instead of accessing each page to find a match with the query and to return a result set in acceptable time.

A user's human thinking, emotions, feelings, behavior and inherent behavioral aspects make up the user's personality. A user's personality includes several personal traits. Some examples of a user's traits that form the user's personality include curiosity, closeness, excitement, practicality, stability, conservation, adventurousness, intellect, cheerfulness, self-efficacy, self-discipline, outgoing, altruism, modesty, trust, fiery, melancholy, and many others.

Many personality models exist to describe and quantify a person's personality. For example, a hierarchical model of personality traits describes a personality at the highest level as comprising Needs, Values, and Big 5 [personality traits]. Liberty is a type of Needs trait. Hedonism a type of Values trait. Openness, conscientiousness, extraversion, agreeableness, and emotional range are five broad types of Big 5 traits. Curiosity, closeness, excitement, practicality, and stability are types of the liberty trait under the Needs trait; conservation is a type of hedonism trait under the Values trait; adventurousness and intellect are types of openness trait in the Big 5 traits; cautiousness and self-discipline are types of conscientiousness traits under the Big 5 traits; self-efficacy is a trait that can be a type of conscientiousness or extraversion trait under the Big 5 traits; cheerfulness and outgoing are types of extraversion trait under the Big 5 traits; altruism and modesty are types of agreeableness trait under the Big 5 traits; trust can be a type of agreeableness or emotional range trait under the Big 5 traits; fiery and melancholy are types of emotional range trait under the Big 5 traits.

Hundreds of personality traits can similarly be identified and organized into different categories or groups. Many different personality models organize these and many other traits in this and other manner.

An existing model can determine a person's traits, compute a value for a trait, and compile a set of personality data for the person. Personality data includes a trait and its corresponding value. A set of personality data includes a set of traits and a corresponding set of trait values.

SUMMARY

The illustrative embodiments provide a method, system, and computer program product. An embodiment includes a method that obtains, responsive to a search query submitted by a user, a result set, the result set comprising a plurality of pages. The embodiment determines a first personality score of a first page in the set of pages and a second personality score of a second page in the set of pages. The determining uses a value of a personality trait of the user and a weight associated with the value and at least one of (i) a personality score of a site from which a first page is obtained, the personality score of the site being based on a personality analysis of another content on the site, and (ii) a personality score of an author of the first page, the personality score of the author being based on a personality analysis of another content published by the author. The embodiment orders, responsive to the first personality score exceeding the second personality score, the first page ahead of the second page in the result set for form a rearranged result set. The embodiment presents the rearranged result set such that the user finds the first page which is more compatible with the user's personality traits listed before the second pages less compatible with the user's personality traits, even when the first page and the second page are equally relevant to the search query.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
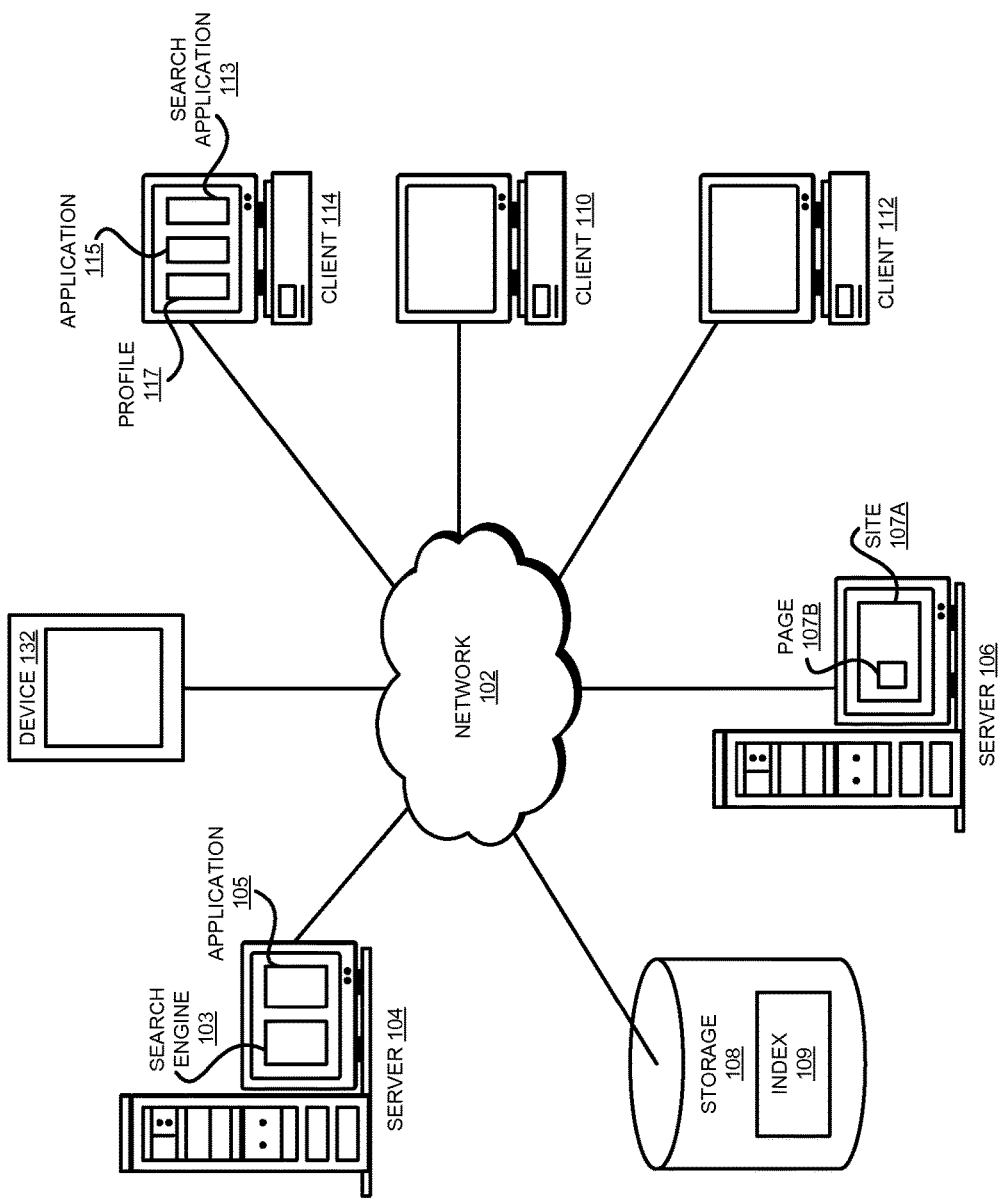
FIG. 1 depicts a block diagram of a network of data processing systems in which illustrative embodiments may be implemented.

Only for the clarity and simplification of the description, the various embodiments are described using some of the traits according to the Big 5 model. These examples of personality traits are not intended to be limiting. From this disclosure, those of ordinary skill in the art will be able to adapt an embodiment to use other personality traits and other personality models, and such adaptations are contemplated within the scope of the illustrative embodiments.

The illustrative embodiments recognize that presently available search technology can produce result sets that are highly relevant to the search query submitted by a user. However, the presently available search technology is insufficient to produce or organize the result set in a manner of relevance to the user' personality with consideration to the personality of related pages on the site and other pages authored by same author with respect to a page. This results in greater accuracy in personality match in search results, relevance and type ahead prompts; especially when a single page does not have enough text for accurate classification.

The illustrative embodiments used to describe the invention generally address and solve the above-described problems and other problems related to making a search result relevant to a user's personality.

A user who authors a page (author) has personality traits. A user who performs a search (searcher) has personality traits as well. The personality of any user can be quantified in a set of personality data of the user.

The illustrative embodiments recognize that just as a user can have personality traits, a page too can have personality traits. A personality trait of a page is a degree of appeal that the content of the page has to a particular personality trait of a user. For example, a page that includes more active verbs than passive verbs has more appeal to, for example, a person with higher than average value for assertiveness trait (under the extraversion trait in the Big 5 traits), and therefore has an assertiveness trait. A page whose content has more than a threshold degree of negative sentiment has a carelessness personality trait because such content would appeal more to a person with a carelessness trait.

The illustrative embodiments recognize that in a manner similar to a personality data associated with a user, a personality trait associated with a page can be quantified as personality data of the page. The illustrative embodiments further recognize that a set of personality data associated with a page can be stored in the index relative to the entry corresponding to the page in the index. For example, the personality scores of different pages can be computed according to an embodiment and stored along with the entries of those pages in the index, when the search index is built or updated.

An embodiment performs an ingestion process. The ingestion process modifies the formation or the maintenance of an index of pages for search purposes. When a page is accessed for indexing, the embodiment also analyzes the page's personality traits.

For example, the embodiment analyzes the personality traits of the page (Pp). The embodiment further analyzes the personality traits of the site (Ps) where the page exists, such by analyzing and combining the personality traits of all or several pages of the site. The embodiment further analyzes the personality traits of the author (Pa) of the page, such by analyzing and combining the personality traits of all or several pages authored by the same author. The pages authored by the author are not limited to pages within the site, and may be located anywhere online.

For performing the personality analyses Pp, Ps, and Pa, the embodiment employs any number and types of analysis techniques. For example, sentiment analysis technique identifies a sentiment value of content. Using sentiment analysis, the embodiment determines a sentiment of the one or more pages in question, and identifies a corresponding personality trait from one or more personality models. For example, if the sentiment of a page is negative, the page may be deemed to have an extraversion trait with a low value (to indicate an introvert trait and a mismatch with a person of extrovert trait), or a trust trait with a low value (to indicate untrustworthiness and a mismatch with a person having a trust trait), a harmony trait with a low value (to indicate inharmoniousness and a mismatch with a person having a harmony trait), or melancholy trait with a high value (to indicate negativity and a good match for a person with melancholy trait), and many other traits as the case may be. For example, if the negative sentiment is supported by justification, the trust trait may receive a high value for being a good match for a person with trust trait.

As another example, the embodiment may use grammatical analysis. A grammatical analysis technique uses English Slot Grammar (ESG) parse or Kincaid reading level determination to evaluate whether a document has good sentence structure. A document with good sentence structure is a good match for a person with high "conscientious" personality.

As another example, the embodiment may use domain analysis. A domain analysis technique might reveal that a page references a variety of sources by referencing several domains and/or sub-domains. The embodiment may be configured to determine that a page with many varied domains or high variation of sub-domains is a good match for the "openness/curious" personality.

Semantic analysis techniques also reveal additional properties of a page in question. The embodiment correlates a semantic property to a personality trait in a similar manner.

By analyzing the pages in this manner, for example, two pages may be scored by the ingestion process of the embodiment on certain Big 5 traits as follows—

Page 1—Openness 0.95, Conscientiousness 0.3, Extraversion 0.5

Page 2—Openness 0.45, Conscientiousness 0.8, Extraversion 0.6

These example analyses, page properties, corresponding personality traits, and trait values for a page are not intended to be limiting. Numerous methods are available to perform the sentiment analysis, the grammatical analysis, the domain analysis, and the semantic analysis on the contents of a page. An embodiment can be configured to use any such method, any number of such methods, more than one method of a type, or a combination of different methods of these and other different types to analyze a page and extract any number of properties of the page. An embodiment can be further configured to associate an extracted property of the page with one or more personality traits in an implementation-specific manner.

The value assigned to a personality trait associated with the page is also highly configurable according to the circumstances of an implementation. For example, one analysis may justify one value for a property when used alone, but when combined with another analysis, the combined analysis might support a different value for the same property. Such variations and adaptations of the embodiment are contemplated within the scope of the illustrative embodiments.

Thus, the embodiment produces a set of personality data for a page. Note that a subset of personality data may be page-specific (Pp), another subset of the personality data may be author-specific (Pa), and another subset of the personality data may be site-specific (Ps). Those of ordinary skill in the art will be able to conceive other specificity for other subsets of the personality data of a page and the same are contemplated within the scope of the illustrative embodiments.

Another embodiment performs a profiling process. The profiling process creates or modifies a profile of a user, where the profile includes a set of personality data of the user. The embodiment can be configured to use one or more of the several methods of configuring the personality data in a user's profile as described herein, and other methods that will become apparent from this disclosure to those of ordinary skill in the art.

As one example method, a user can simply identify the user's own personality traits and self-assign values to those traits. The embodiment saves the identified traits and their values as a set of personality data in the user's personality profile.

As another example method, the embodiment presents to the user a personality assessment questionnaire. The user answers the questions in the questionnaire. The embodiment analyzes the answers according to pre-configured answer-analysis rules, to identify the user's personality traits and their corresponding values. The embodiment saves the identified traits and their values as a set of personality data in the user's personality profile.

As another example method, the embodiment collects content published by the user, such as on social media, websites, and other online sources accessible to the embodiment. The embodiment analyzes the collected content according in a manner similar to page analysis methods described herein, to identify the user's personality traits and their corresponding values. The embodiment saves the identified traits and their values as a set of personality data in the user's personality profile.

For example, an embodiment performs one or more of such as sentiment analysis, grammar analysis, semantic analysis, domain analysis, and the like, as described herein to map the user's personality to one or more Needs, Values, and Big 5 traits. The embodiment also analyzes the user's social connections for density and distance of connections, and the frequency of interactions with those connections. An analysis of the interactions provides the embodiment additional data points to further enhance the accuracy of the user's personality profile.

Furthermore, another embodiment associates a weight with a personality trait. A set of traits can have a corresponding set of weights associated therewith. For example, a person may be trusting as well as outgoing, but the person may be more trusting than outgoing. Accordingly, a page that appeals to the trust trait better matches the personality of the user better as compared to another page that appeals to the outgoing trait if both pages were otherwise ranked equally by the search engine.

The embodiment can determine the weights in any suitable manner. For example, the user can specify different weights for the different traits, the embodiment can compute a weight of a trait from the questionnaire or content analysis of the user's publications, or some combination of these and other similarly purposed methods.

An embodiment performs a search process, for example, when implemented to operate in conjunction with a search application on a client. The embodiment obtains a result set in response to a search query. The pages in the result set have associated therewith personality data of those pages, which is also included in the result set.

One variation of the embodiment computes a personality score of a page in the result set as follows—For example, suppose that a user or search service wanted to have the result set organized by giving most weight (weight A) to the personality of the page (Pp), a lesser weight (weight B) to the personality of the author (Pa), and a still lesser weight (weight C) to the personality of the site (Ps). Accordingly, when the personality data of the page includes values for Pp, Pa, and Ps, the embodiment determines the personality score of the page as follows—

$$P=A*Pp+B*Pa+C*Ps$$

Another variation of the embodiment computes a personality score of a page in the result set as follows—For example, suppose that two users—User 1 and User 2—submit the same search query, which results in a result set including two pages that are otherwise equally relevant to the search query, and whose personality traits are—

Page 1—Openness 0.95, Conscientiousness 0.3, Extraversion 0.5

Page 2—Openness 0.45, Conscientiousness 0.8, Extraversion 0.6

Suppose that User 1 has Inventive, Careless, and Energetic traits.

Without assigning any particular relative weightage to any of these traits, the personality scores of the two pages will be as follows—

Personality score of Page 1=0.95 [because the Openness trait of Page 1 is equivalent or applicable to the Inventiveness trait of User 1], multiplied by (1−0.3) [because the Conscientiousness trait of Page 1 is the opposite of the Carelessness trait of User 1], multiplied by 0.5 [because the Extraversion trait of Page 1 is equivalent or applicable to the Energetic trait of User 1]=0.33.

By similar reasoning, the personality score of Page 2 is 0.45*(1−0.8)*0.6=0.05. Because the personality score of Page 1 is greater than the personality score of Page 2—when Page 1 and Page 2 are otherwise equally relevant to the search—the embodiment ranks Page 1 higher in the result set as compared to Page 2 and rearranges the ordering of the pages in the result set to reflect this ranking for User 1.

Of course this result could be altered if User 1 has different weights to the different traits of the user, of the page, or both. For example, if for User 1 has a 0.9 weight for Inventive trait, 0.5 weight of the carelessness trait, and 0.3 weight for the Energetic trait, Page 1 score would be (0.9*0.95)*(0.5*(1−0.3))*(0.3*0.5)=0.0448, and Page 2 score would be (0.9*0.45)*(0.5*(1−0.8))*(0.3*0.6)=0.007. the separation between pages 1 and 2 is much greater, and the reordered result set could perhaps have more pages between pages 1 and 2 than when no weights were applied.

Now suppose that User 2 has Consistent, Organized, and Reserved traits.

Without assigning any particular relative weightage to any of these traits, the personality scores of the two pages will be as follows—

Personality score of Page 1=(1−0.95) [because the Openness trait of Page 1 is the opposite of the Consistent trait of User 2], multiplied by 0.3 [because the Conscientiousness trait of Page 1 is equivalent or applicable to the Organized trait of User 2], multiplied by (1−0.5) [because the Extraversion trait of Page 1 is the opposite of the Reserved trait of User 2]=0.008.

By similar reasoning, the personality score of Page 2 is (1−0.45)*0.8*(1−0.6)=0.176. Because the personality score of Page 2 is greater than the personality score of Page 1—when Page 1 and Page 2 are otherwise equally relevant to the search—the embodiment ranks Page 2 higher in the result set as compared to Page 1 and rearranges the ordering of the pages in the result set to reflect this ranking for User 2. Again, if User 2 has weighted certain traits of the user or the page differently, the result set could be ordered differently.

These examples demonstrate how a different search result ranking for the same two search results pages is determined by the embodiment based on the profile of the user invoking the search query. The equivalence or analogies between user traits and page traits can be configured in any manner suitable to an implementation and is not limited to the equivalence used in the examples described herein.

Even when the personality data of the pages is not available in a result set, an embodiment determines the relevance of a page to a personality of the user and reorders the result set accordingly with consideration to other parameters in the search query and context. For example, while many pages in the results may be relevant to the search query, an embodiment determines the relevance of a particular page to the personality of the user using a page analysis technique in a manner described herein. For example, assume that the search query is "Why is the sky blue?" further assume that the result set includes the following three pages without implying any particular ordering—

Page 1, which contains the content—"Together, as Lord Rayleigh explained, the molecules of these gases scatter the blue colors of sunlight much more effectively than the green and red colors. Therefore, a clean sky appears blue. In many places air pollution causes haze that causes the sky to appear pale blue or even milky white."

Page 2, which contains the content—"The first steps towards correctly explaining the color of the sky were taken by John Tyndall in 1859. He discovered that when light passes through a clear fluid holding small particles in suspension, the shorter blue wavelengths are scattered more strongly than the red. This can be demonstrated by shining a beam of white light through a tank of water with a little milk or soap mixed in. From the side, the beam can be seen by the blue light it scatters; but the light seen directly from the end is reddened after it has passed through the tank. The scattered light can also be shown to be polarized using a filter of polarized light, just as the sky appears a deeper blue through polaroid sun glasses."

Page 3, which contains the content—"ok so i am trying to join this cool forum place and on the forum to join it asks me this question "what color is the sky" and i am very confused because i dont know what they mean. do they mean the color of the sky now? like its gray right now because there are clouds everywhere because i live in ohio and ohio is stupid because we never have good weather its always cloudy and ugly what should i do? i know the forum was made in california should i check the weather there? i think it's dark there right now. would the answer be dark blue or black?"

Using one or more page analysis techniques in a manner described herein, the embodiment determines that pages 1 and 2 show high organization but page 3 would be more appropriate for a user with Careless and/or Confident trait due to the high incidence of negative sentiment in page 3. If the searcher had a Careless or a Confident personality trait, the embodiment would cause page 3 to be raked higher in the result set as compared to pages 1 or 2. If the searcher did not have a Careless or a Confident personality trait, the embodiment would cause page 3 to be raked lower in the result set as compared to pages 1 and 2.

In one embodiment, the rearranging of the result set, determining a relevance value of a search result to the search query, and even the type-ahead prompt, can be implemented on the server-side, as a part of a modified search engine. In such a configuration, when a search query is invoked by a user, all or some of the user's personality traits are passed as part of the search query or as additional parameters to the modified search engine. The modified search engine calculates the computed personality score of each result with respect to the personality traits of the user. The modified search engine thus delivers the results of the search service according to personality-relevance to the user. The personality-relevance of the search results can be responsive to a regular search or type-ahead, and can improve the search relevance and other features of search services. Furthermore, the user's personality traits could be derived from, but are not limited to, personality traits of similar users, browsing or other behavior or patterns of the user or other similar users, social media contributions of the user or other similar users, a context of the user's search, and the like.

Type-ahead is the process by which a search application assists a searcher in inputting a search term. When the searcher has entered a partial search query, an intermediate search takes place to find suitable completion phrases to complete inputting the search term while the user is still typing the search term. Finding suitable type-ahead phrases given a partial search phrase is principally similar to a regular search for finding a suitable result set given a complete search term as far as the triggered search queries are concerned.

Because of the similarities between a regular search and type-ahead, an embodiment is adaptable to make type-ahead also relevant to a searcher's personality. For example, suppose that a conclusion of a sentimental analysis is that people with an Introvert trait prefer passive verbs to active verbs, and people with an Extrovert trait prefer active verbs to passive verbs. Based on this knowledge, if a partial search query is "baseball game where to", and the searcher has an Introvert trait, an embodiment can reorder the result set of type-ahead options to suggest "baseball game where to watch" ahead of "baseball game where to play". If the searcher has an Extrovert trait, the embodiment would reorder the result set of type-ahead options to suggest "baseball game where to play" ahead of "baseball game where to watch".

Once a rearranged result set—whether a result set of pages in response to a query or a result set of type-ahead options in response to a partial query input—is presented to the user, the user responds to the result set. Typically, the user will click or provide some input relative to some entries in the result set.

An embodiment captures the user inputs relative to the result set and analyzes the inputs. By this analysis, the embodiment determines whether the user's choices are consistent with the embodiment's determinations of personality matches between the user and the page, the user and the site, the user and the author, or some combination thereof. If for example, an embodiment ranked a page the highest for personality compatibility with the user, and the user did not select that page, the embodiment adjusts a personality trait, a trait value, a weight of the trait, or some combination thereof, of the user such that the pages that did receive the user's input may rank higher than the page that the embodiment ranked the highest when considered with the other weighted factors.

In some cases, the user may provide an express feedback on the reordering of a result set. The feedback indicates to the embodiment how the user would have liked the result set reordered. The embodiment adjusts a personality trait, a trait value, a weight of the trait, or some combination thereof, of the user such that the pages that the user preferred would rank higher than the page that the embodiment preferred for bubbling up in the result set.

Several operations of one or more embodiments are described herein with respect to an operation in conjunction with a search application on a client. These examples of client-side operations are not intended to be limiting. From this disclosure, those of ordinary skill in the art will be able to conceive ways of performing similarly purposed operations in conjunction with a search engine on the server-side, and the same are contemplated within the scope of the illustrative embodiments.

Similarly, an operation of an embodiment described as occurring on the server-side can be implemented with suitable adaptations on the client-side. Such adaptations are contemplated within the scope of the illustrative embodiments.

Generally, a function or operation of an embodiment is configurable in a software application. The software application can be configured as a modification of a search engine or a search application, as a separate application that operates in conjunction with an existing search engine or an existing search application, a standalone application on the server-side or the client-side or in some distribution between the two sides, or some combination thereof.

A method of an embodiment described herein, when implemented to execute on a device or data processing system, comprises substantial advancement of the functionality of that device or data processing system in personality-relevant searching. For example, presently available search technology is designed to produce a result set that is relevant to the search query but not to the personality of the searcher. An embodiment rearranges the result set according to a match between a personality trait of the searcher and a personality trait of the page in the result set, a personality trait of a site where the page belongs, a personality trait of an author of the page, or some combination thereof. The embodiments use analytically derived personality traits in determining the search results, relevance of the results, and type-ahead prompts, thereby relating a search to the human thinking, emotions, feelings, behavior and other personality traits of the searcher, data authors, clusters of searchers with similar personalities, or a combination thereof. This manner of personality-relevant searching is unavailable in the presently available methods. Thus, a substantial advancement of such devices or data processing systems by executing a method of an embodiment is in making search results relevant to a personality of the searcher.

The illustrative embodiments are described with respect to certain pages, sites, content, personality models, personality traits, equivalence or analogies between traits, trait values, weights, computations, scores, ordering of results, profiles, queries, query results, type-ahead, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data (structured and unstructured) or content, data (structured and unstructured) or content source, or access to a data (structured and unstructured) or content source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
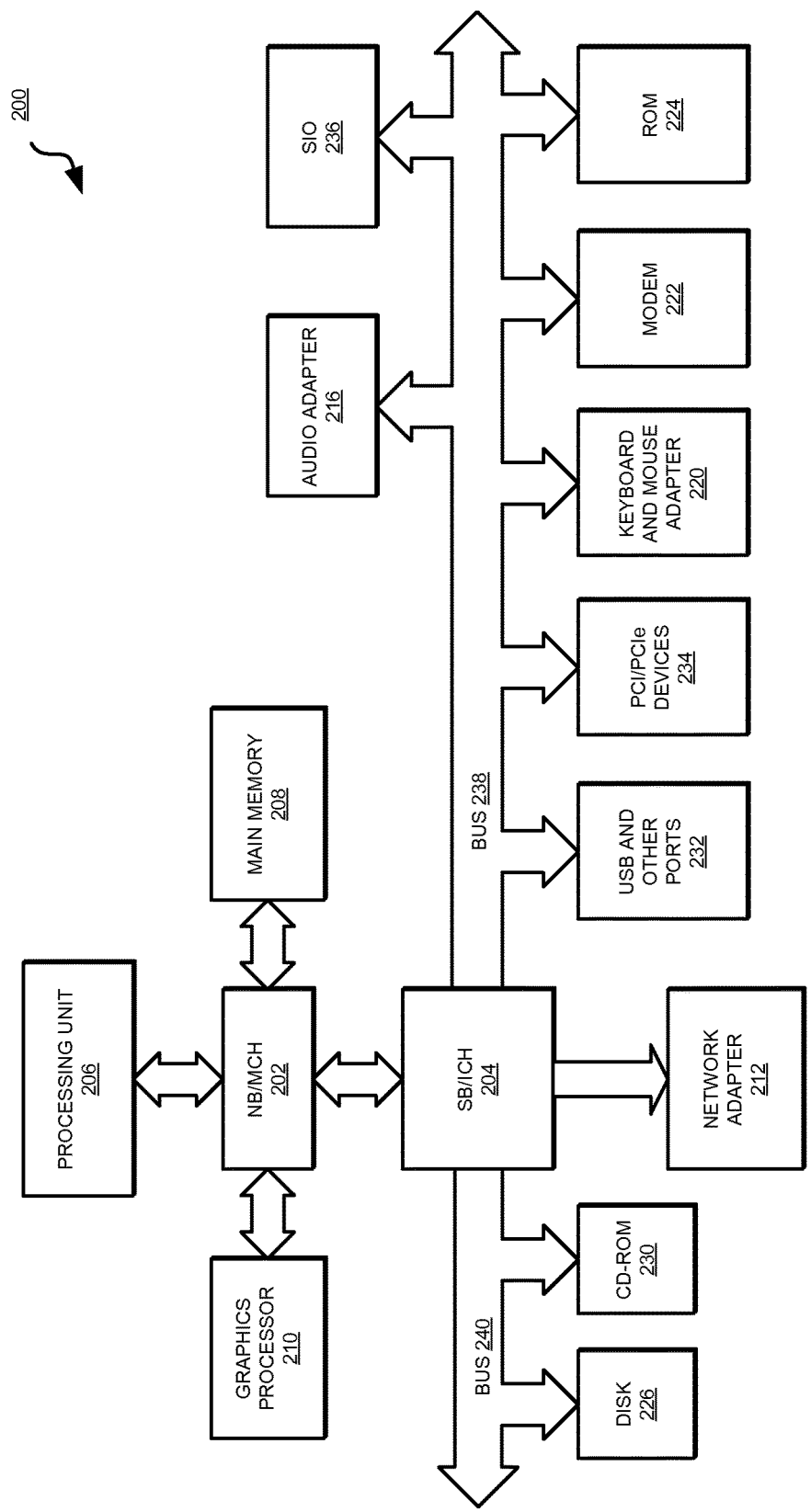
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment or a function thereof as described herein to operate in conjunction with search engine 103. For example, application 105 produces index 109, which includes an entry for page 107B from site 107A. The entry for page 107B includes a set of personality data as described herein. Application 115 implements an embodiment or a function thereof as described herein to operate in conjunction with search application 113. For example, application 115 produces profile 117 of a searcher, which includes a set of personality data as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 or application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
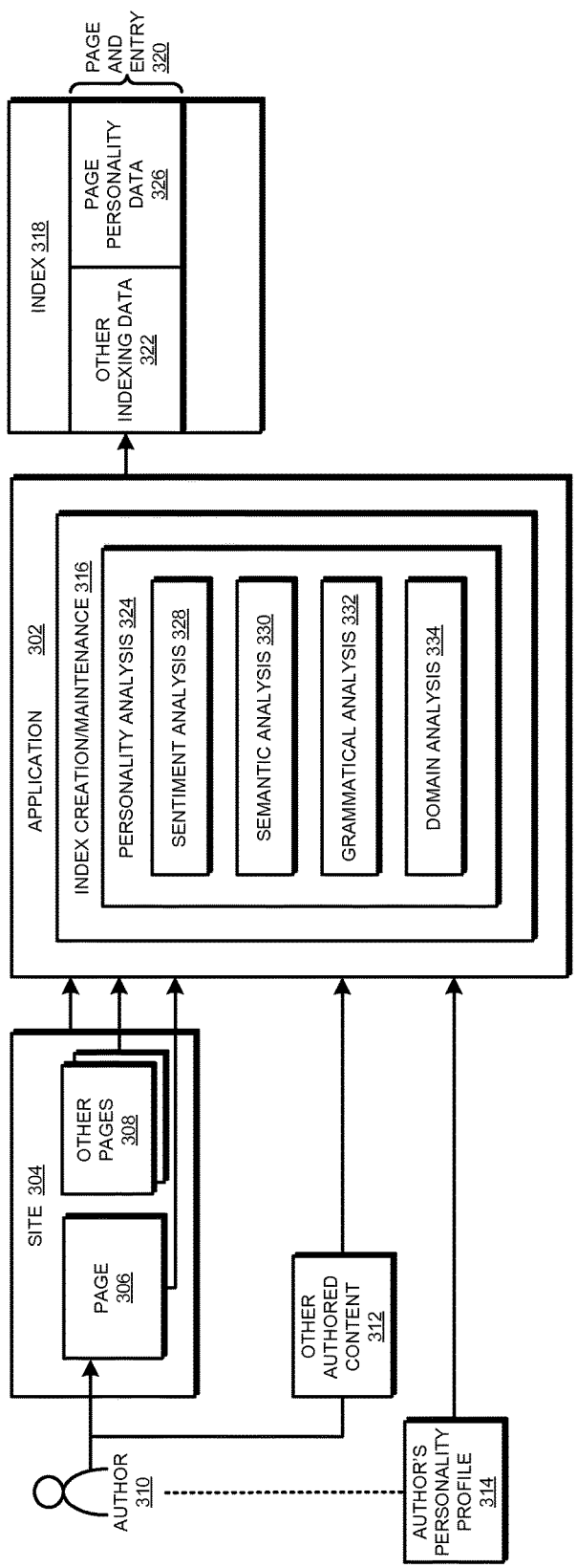
FIG. 3 depicts a block diagram of an example configuration for an ingestion process in accordance with an illustrative embodiment.

With reference to FIG. 3, this figure depicts a block diagram of an example configuration for an ingestion process in accordance with an illustrative embodiment. Application 302 is an example of application 105 in FIG. 1. Under certain circumstances, application 302 can be configured as application 115 in FIG. 1.

Site 304 is an example of site 107A in FIG. 1. Page 306 is an example of page 107B in FIG. 1. Other pages 308 are other content available on site 304. Author 310 has authored page 306 and other content 312. Profile 314 may be a pre-existing personality profile of author 310, constructed to include a set of personality data as described herein.

Component 316 creates or maintains index 318. Index 318 is used for performing a search of online or offline data or content in response to a search query. Index 318 includes entry 320, which corresponds to page 306. Other indexing data 322 is indexing data presently created and used by search engines for generating a result set that is relevant to a search query.

Component 324 performs personality analysis of page 306 to produce page personality data 326. Page personality data 326 is a set of personality data of page 306. As some non-limiting examples, personality analysis component 324 performs sentiment analysis 328, semantic analysis 330, grammatical analysis 332, domain analysis 334, or some combination of these and other similarly purposed analytical methods. Using one or more of analyses 328-334 and/or other analyses, component 324 produces page personality data 326 for page 306.

Figure 4:
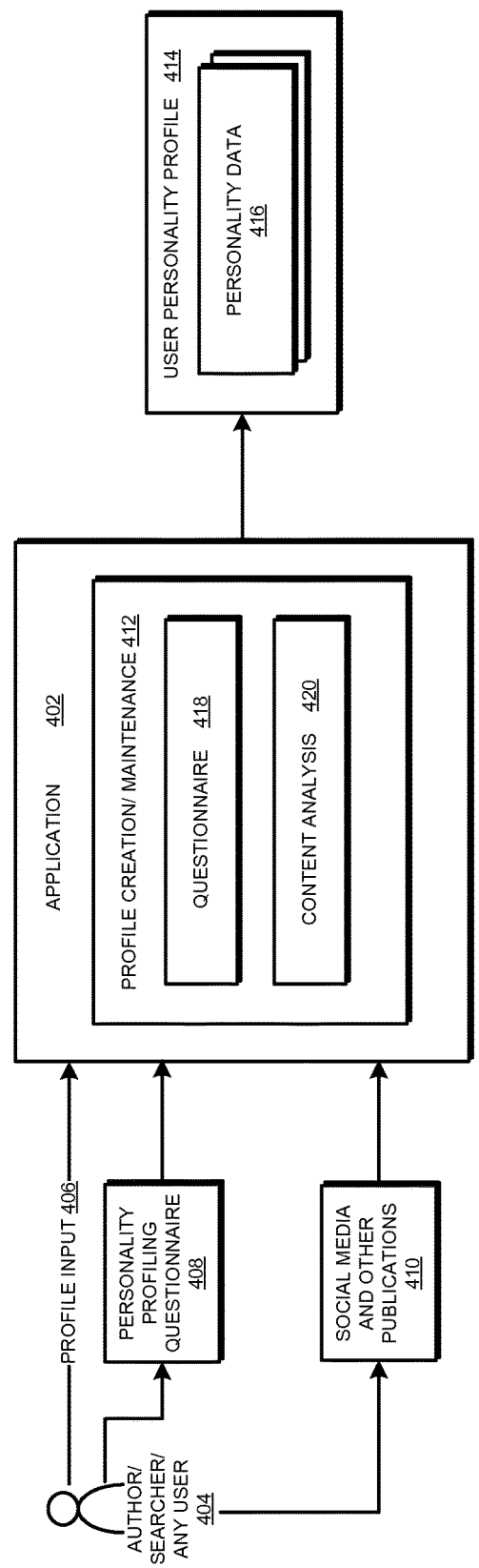
FIG. 4 depicts a block diagram of an example configuration for a profiling process in accordance with an illustrative embodiment.

With reference to FIG. 4, this figure depicts a block diagram of an example configuration for a profiling process in accordance with an illustrative embodiment. Application 402 is an example of application 115 in FIG. 1. In some circumstances, application 402 can be implemented as application 105 in FIG. 1. Application 402 can also be implemented as an extension of application 302 in FIG. 3.

User 404 can be an author, such as author 310 in FIG. 3, a searcher, or any user in general. User 404 may either provide profile input 406 including personality traits and trait values of user 404, answer personality profiling questionnaire 408, publish content 410 on social media or other online sources, or some combination thereof.

Component 412 creates or maintains personality profile of user 404. Profile 414 includes set 416 of personality data as described herein.

If user 404 responds to questionnaire 406, component 418 analyzes the questionnaire responses to extract a personality trait of user 404. If content 410 is available and needed to build profile 414, component 420 analyzes content 410 to extract a personality trait of user 404. Component 412 populates set 416 of personality data with the extracted traits and their determined values as described herein.

Figure 5:
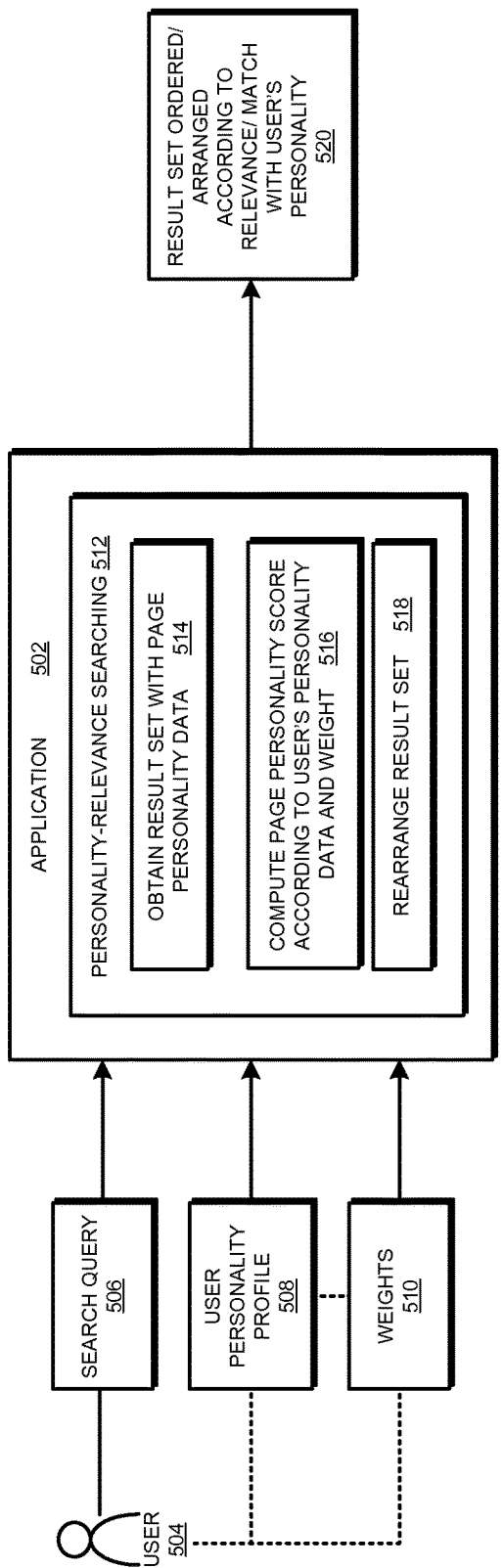
FIG. 5 depicts a block diagram of an example configuration for a personality-relevant searching process in accordance with an illustrative embodiment.

With reference to FIG. 5, this figure depicts a block diagram of an example configuration for a personality-relevant searching process in accordance with an illustrative embodiment. Application 502 is an example of application 115 in FIG. 1. In some circumstances, application 502 can be implemented as application 105 in FIG. 1. Application 502 can also be implemented as an extension of application 402 in FIG. 4.

User 504 is an example of user 404 in FIG. 4. User 404 inputs search query 506 for performing a search. User personality profile 508 is related to user 504, is available to application 502, and is an example of profile 414 in FIG. 4. For a set of traits in profile 508, corresponding set of weights 510—a weight for each trait—is also available to application 502.

Component 512 performs the personality-relevant searching. For example, component 514 obtains a result set from a search engine, such as search engine 103 in FIG. 1. A page in the result set may include the corresponding personality data, or the corresponding personality data of the page may be computed by component 514 in a manner described herein.

According to one embodiment, in a configuration where application 502 operates in conjunction with a search engine or is implemented within a modified search engine, upon invocation of a search query by a user, the user's personality data is passed as part of the search query or as additional parameters to the search engine by application 502. Component 516 computes a page personality score of the pages in the result set. The page personality score of the pages is computed according to the user's personality data from profile 508 and weighs 510 as described herein. Component 518 rearranges the result set according to the computed personality scores of the pages and produces rearranged result set 520. Rearranged result set 520 has the pages reordered according to the relevance or match with the personality of user 504.

Figure 6:
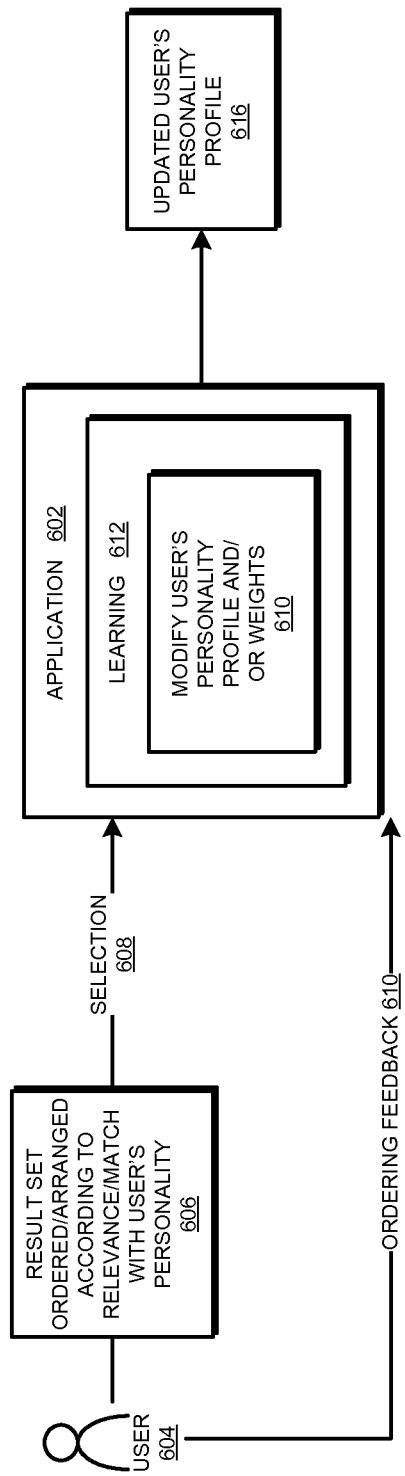
FIG. 6 depicts a block diagram of an example configuration for a machine learning process in accordance with an illustrative embodiment.

With reference to FIG. 6, this figure depicts a block diagram of an example configuration for a machine learning process in accordance with an illustrative embodiment. Application 602 is an example of application 115 in FIG. 1. In some circumstances, application 602 can be implemented as application 105 in FIG. 1. Application 602 can also be implemented as an extension of application 502 in FIG. 5.

User 604 is a user whose personality data was used to produce rearranged result set 606. If rearranged result set 606 were the same as rearranged result set 520 in FIG. 5, user 604 would be user 504 in FIG. 5.

User 604 provides an input relative to rearranged result set 606, such as by making selection 608 and selecting a page from rearranged result set 606. Optionally, user 604 may provide feedback 610 about the order of the pages in rearranged result set 606.

Component 612 compares selection 608 and/or feedback 610 with the ordering performed by component 512 and its subcomponents in FIG. 5. If the ordering preferred by user 604 appears to be different from the ordering performed by component 512, component 614 adjusts the user's personality data and/or a weight associated with a trait of the user such that the ordering performed by component 512 of FIG. 5 is closer to the ordering preferred by users in the same cluster as user 604, i.e., users who have similar personality traits. Component 614 produces updated personality profile 616 of user 604.

Figure 7:
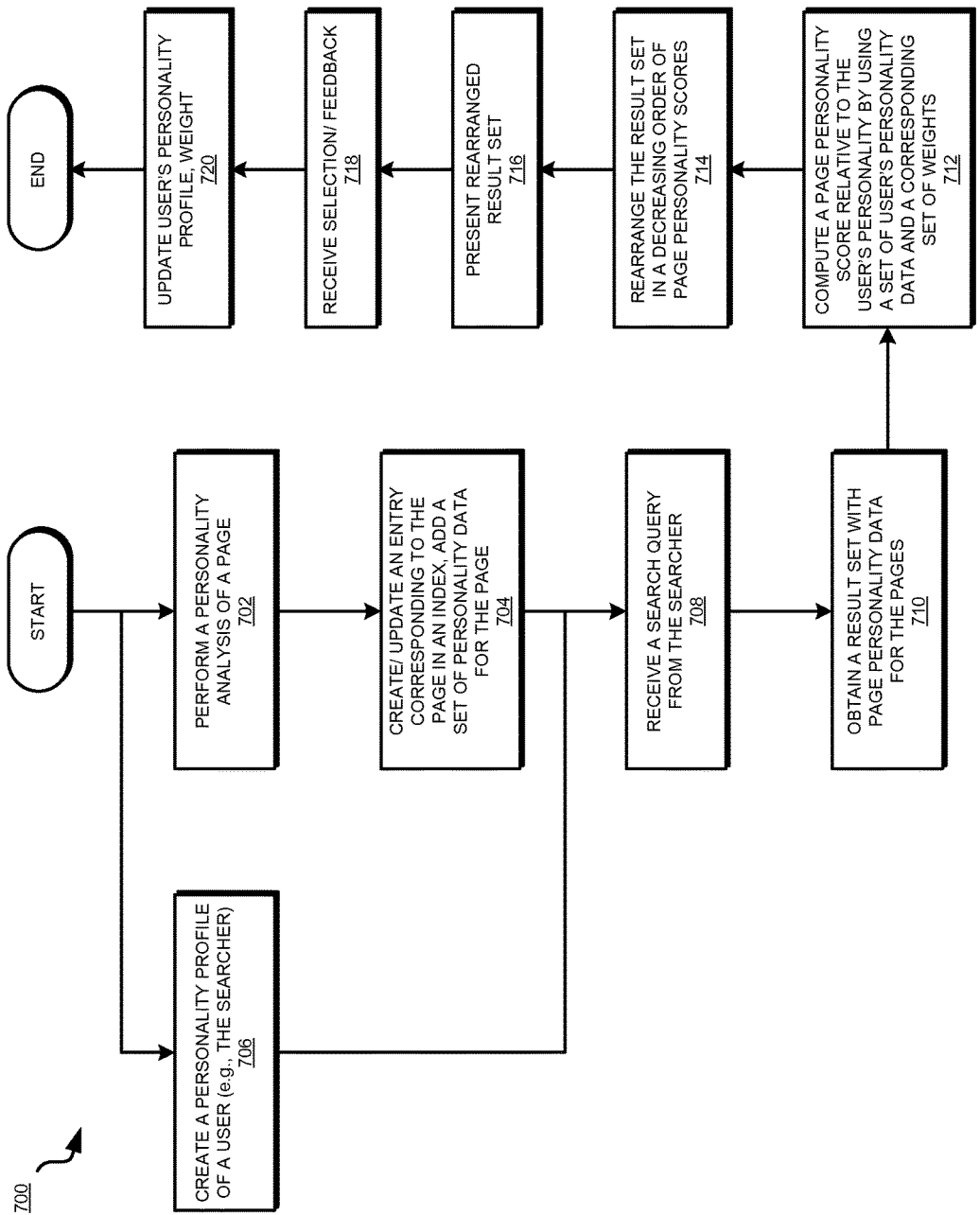
FIG. 7 depicts a flowchart of an example process for personality-relevant searching in accordance with an illustrative embodiment.

With reference to FIG. 7, this figure depicts a flowchart of an example process for personality-relevant searching in accordance with an illustrative embodiment. Process 700 can be implemented in an application formed by combining the features described with respect to applications 302, 402, 502, and 602.

In two independent branches of process 700, the application performs the ingesting and the profiling operations. For example, in one branch, the application performs a personality analysis of a page (block 702). The application creates or updates an entry corresponding to the page in an index, and adds a set of personality data to the entry based on the analysis of block 702 (block 704).

In another branch, the application creates or updates a personality profile of a user, e.g., a searcher (block 706).

At some point in time, the application receives or detects a search query from the searcher (block 708). The application obtains a result set in response to the search query (block 710). The application receives or computes a set of personality data of the pages in the result set at block 710.

For all or some pages in the result set, the application computes a page personality score relative to the user's personality by using a set of personality data and a corresponding set of weights for the user (block 712). The application rearranges the result set in a decreasing order of the page personality scores (block 714).

The application presents the rearranged result set to the searcher (block 716). The application receives a selection or feedback from the user (block 718). The application updates the user's personality data or a weight according to the selection or feedback (block 720). The application ends process 700 thereafter.

Thus, a computer implemented method, system or apparatus, and computer program product are provided in the illustrative embodiments for personality-relevant searching. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

obtaining, responsive to a search query submitted by a user, a result set, the result set comprising a set of pages;

determining a first personality score of a first page in the set of pages using a value of a personality trait of the user, a weight associated with the value, and a personality score of an author of the first page, the personality score of the author being based on a personality analysis of another content published by the author, wherein the personality score of the first page is based on a plurality of personality traits computed for the first page, the plurality of personality traits comprising a first trait to indicate an extraversion trait, a trust trait, a harmony trait, and a melancholy trait according to a Big 5 personality traits model;

determining a second personality score of a second page in the set of pages using the value of the personality trait of the user, the weight associated with the value, and a second personality score of a second author of the second page, the second personality score of the second author being based on a second personality analysis of a different content published by the second author;

ordering, responsive to the first personality score exceeding the second personality score, the first page ahead of the second page in the result set to form a rearranged result set;

presenting the rearranged result set such that the user finds the first page which is more compatible with the user's personality traits listed before the second pages less compatible with the user's personality traits, even when the first page and the second page are equally relevant to the search query;

analyzing, using English Slot Grammar technique, the first page to determine a grammatical expression in the page, wherein the grammatical expression comprises a sentence structure in the page;

identifying, from a personality model, a personality trait of the first page corresponding to the grammatical expression, the identified personality trait comprising a conscientious trait;

computing a value of the personality trait of the first page according to a value of the grammatical expression; and assigning to the first page a personality data comprising the personality trait of the first page and the value of the personality trait of the first page.

2. The method of claim 1, further comprising:

receiving a selection input relative to the rearranged result set, the selection indicating a user preference of ordering a third page according to the user's personality traits; and adjusting a value corresponding to a trait in the user's personality traits to change the order of the third page according to the user's preference.

3. The method of claim 1, further comprising:

constructing a personality profile of the user by determining a set of personality traits of the user according to a personality model, the set of personality traits including the personality trait;

computing a value for each personality trait in the set of personality traits; and adding each personality trait from the set of personality traits and a corresponding value as a distinct personality data in the personality profile.

4. The method of claim 1, further comprising:

computing a page-specific personality score of the first page;

computing an overall personality score of the first page using (i) a personality score of the site from which the first page is obtained, the personality score of the site being based on a personality analysis of another content on the site, and (ii) the page-specific personality score of the first page; and using the overall personality score in the first personality score of the first page.

5. The method of claim 1, further comprising:

computing a page-specific personality score of the first page;

computing an overall personality score of the first page using the personality score of the author and the page-specific personality score of the first page; and using the overall personality score in the first personality score of the first page.

6. The method of claim 1, further comprising:

computing a page-specific personality score of the first page;

computing an overall personality score of the first page using (i) a personality score of the site from which the first page is obtained, the personality score of the site being based on a personality analysis of another content on the site, (ii) the personality score of the author, and (iii) the page-specific personality score of the first page; and using the overall personality score in the first personality score of the first page.

7. The method of claim 1, further comprising:

analyzing the first page to determine a sentiment in the page;

identifying, from a personality model, a personality trait of the first page corresponding to the sentiment;

computing a value of the personality trait of the first page according to a value of the sentiment; and assigning to the first page a personality data comprising the personality trait of the first page and the value of the personality trait of the first page.

8. The method of claim 1, further comprising:

analyzing the first page to determine a semantic expression in the page;

identifying, from a personality model, a personality trait of the first page corresponding to the semantic expression;

computing a value of the personality trait of the first page according to a value of the semantic expression; and assigning to the first page a personality data comprising the personality trait of the first page and the value of the personality trait of the first page.

9. The method of claim 1, further comprising:

analyzing the first page to determine a diversity of references in the page;

identifying, from a personality model, a personality trait of the first page corresponding to the diversity of the references;

computing a value of the personality trait of the first page according to a value of the diversity of the references; and assigning to the first page a personality data comprising the personality trait of the first page and the value of the personality trait of the first page.

10. The method of claim 1, further comprising:
obtaining, responsive to a partial input of the search query, a set of type-ahead options to complete the search query input; and
ordering a first type-ahead option before a second type-ahead option in the set of type-ahead options responsive to the first type-ahead option relating to a personality trait of the user to a greater degree than the second type-ahead option.

11. The method of claim 1, wherein the method is embodied in a computer program product comprising one or more computer-readable storage devices and computer-readable program instructions which are stored on the one or more computer-readable storage devices and executed by one or more processors.

12. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

13. A computer program product comprising one or more computer-readable storage devices, and program instructions stored on at least one of the one or more storage devices, the stored program instructions comprising:
program instructions to obtain, responsive to a search query submitted by a user, a result set, the result set comprising a set of pages;
program instructions to determine a first personality score of a first page in the set of pages using a value of a personality trait of the user, a weight associated with the value, and a personality score of an author of the first page, the personality score of the author being based on a personality analysis of another content published by the author, wherein the personality score of the first page is based on a plurality of personality traits computed for the first page, the plurality of personality traits comprising a first trait to indicate an extraversion trait, a trust trait, a harmony trait, and a melancholy trait according to a Big 5 personality traits model;
program instructions to determine a second personality score of a second page in the set of pages using the value of the personality trait of the user, the weight associated with the value, and a second personality score of a second author of the second page, the second personality score of the second author being based on a second personality analysis of a different content published by the second author;
program instructions to order, responsive to the first personality score exceeding the second personality score, the first page ahead of the second page in the result set to form a rearranged result set;
program instructions to present the rearranged result set such that the user finds the first page which is more compatible with the user's personality traits listed before the second pages less compatible with the user's personality traits, even when the first page and the second page are equally relevant to the search query;
program instructions to analyze, using English Slot Grammar technique, the first page to determine a grammatical expression in the page, wherein the grammatical expression comprises a sentence structure in the page;
program instructions to identify, from a personality model, a personality trait of the first page corresponding to the grammatical expression, the identified personality trait comprising a conscientious trait;
program instructions to compute a value of the personality trait of the first page according to a value of the grammatical expression; and
program instructions to assign to the first page a personality data comprising the personality trait of the first page and the value of the personality trait of the first page.

14. The computer program product of claim 13, further comprising:
program instructions to receive a selection input relative to the rearranged result set, the selection indicating a user preference of ordering a third page according to the user's personality traits; and
program instructions to adjust a value corresponding to a trait in the user's personality traits to change the order of the third page according to the user's preference.

15. The computer program product of claim 13, further comprising:
program instructions to construct a personality profile of the user by determining a set of personality traits of the user according to a personality model, the set of personality traits including the personality trait;
program instructions to compute a value for each personality trait in the set of personality traits; and
program instructions to add each personality trait from the set of personality traits and a corresponding value as a distinct personality data in the personality profile.

16. The computer program product of claim 13, further comprising:
program instructions to compute a page-specific personality score of the first page;
program instructions to compute an overall personality score of the first page using (i) a personality score of the site from which the first page is obtained, the personality score of the site being based on a personality analysis of another content on the site, and (ii) the page-specific personality score of the first page; and
program instructions to use the overall personality score in the first personality score of the first page.

17. The computer program product of claim 13, further comprising:
program instructions to compute a page-specific personality score of the first page;
program instructions to compute an overall personality score of the first page using the personality score of the author and the page-specific personality score of the first page; and
program instructions to use the overall personality score in the first personality score of the first page.

18. The computer program product of claim 13, further comprising:
program instructions to compute a page-specific personality score of the first page;
program instructions to compute an overall personality score of the first page using (i) a personality score of the site from which the first page is obtained, the personality score of the site being based on a personality analysis of another content on the site, (ii) the personality score of the author, and (iii) the page-specific personality score of the first page; and
program instructions to use the overall personality score in the first personality score of the first page.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to obtain, responsive to a search query submitted by a user, a result set, the result set comprising a set of pages;

program instructions to determine a first personality score of a first page in the set of pages using a value of a personality trait of the user, a weight associated with the value, and a personality score of an author of the first page, the personality score of the author being based on a personality analysis of another content published by the author, wherein the personality score of the first page is based on a plurality of personality traits computed for the first page, the plurality of personality traits comprising a first trait to indicate an extraversion trait, a trust trait, a harmony trait, and a melancholy trait according to a Big 5 personality traits model;

program instructions to determine a second personality score of a second page in the set of pages using the value of the personality trait of the user, the weight associated with the value, and a second personality score of a second author of the second page, the second personality score of the second author being based on a second personality analysis of a different content published by the second author;

program instructions to order, responsive to the first personality score exceeding the second personality score, the first page ahead of the second page in the result set to form a rearranged result set;

program instructions to present the rearranged result set such that the user finds the first page which is more compatible with the user's personality traits listed before the second pages less compatible with the user's personality traits, even when the first page and the second page are equally relevant to the search query;

program instructions to analyze, using English Slot Grammar technique, the first page to determine a grammatical expression in the page, wherein the grammatical expression comprises a sentence structure in the page;

program instructions to identify, from a personality model, a personality trait of the first page corresponding to the grammatical expression, the identified personality trait comprising a conscientious trait;

program instructions to compute a value of the personality trait of the first page according to a value of the grammatical expression; and program instructions to assign to the first page a personality data comprising the personality trait of the first page and the value of the personality trait of the first page.

* * * * *